(12) United States Patent
Jain et al.

(10) Patent No.: US 10,325,054 B2
(45) Date of Patent: Jun. 18, 2019

(54) INVARIANT SHARING TO SPEED UP FORMAL VERIFICATION

(71) Applicant: Synopsys, Inc., Mountain View, CA (US)

(72) Inventors: Himanshu Jain, Hillsboro, OR (US); Per M. Bjesse, Portland, OR (US); Carl P. Pixley, Beaverton, OR (US)

(73) Assignee: Synopsys, Inc., Mountain View, CA (US)

( * ) Notice: Subject to any disclaimer, the term of this patent is extended or adjusted under 35 U.S.C. 154(b) by 79 days.

(21) Appl. No.: 14/167,716

(22) Filed: Jan. 29, 2014

(65) Prior Publication Data

US 2015/0213167 A1     Jul. 30, 2015

(51) Int. Cl.
*G06F 17/50*     (2006.01)

(52) U.S. Cl.
CPC ...... *G06F 17/5081* (2013.01); *G06F 2217/12* (2013.01); *Y02P 90/265* (2015.11)

(58) Field of Classification Search
CPC .................. G06F 17/5022; G06F 17/5045
USPC ........................................................ 716/106
See application file for complete search history.

(56) References Cited

U.S. PATENT DOCUMENTS

| | | | | |
|---|---|---|---|---|
| 7,028,279 | B2 * | 4/2006 | Jain et al. | 716/106 |
| 7,900,173 | B1 * | 3/2011 | Kuehlmann et al. | 716/107 |
| 8,589,837 | B1 * | 11/2013 | Baumgartner | G06F 17/505 |
| | | | | 716/101 |
| 8,799,838 | B2 * | 8/2014 | Tanimoto et al. | 716/107 |
| 8,850,372 | B2 * | 9/2014 | Baumgartner et al. | 716/106 |

OTHER PUBLICATIONS

Cohen et al., "Parallelizing a Symbolic Compositional Model-Checking Algorithm", HVC 2010, LNCS 6504, pp. 46-59, 2011.*
V. Pitchumani and E. P. Stabler, "An inductive assertion method for register transfer level design verification", IEEE Trans. Comput., vol. C-32, pp. 1073-1080, 1983.*

* cited by examiner

*Primary Examiner* — Jack Chiang
*Assistant Examiner* — Brandon Bowers
(74) *Attorney, Agent, or Firm* — Park, Vaughn, Fleming & Dowler LLP; Laxman Sahasrabuddhe

(57) ABSTRACT

Methods and apparatuses are described for sharing inductive invariants while performing formal verification of a circuit design. Specifically, some embodiments assume at least an inductive invariant for a property to be true while proving another property. According to one definition, an inductive invariant of a property is an inductive assertion such that all states that satisfy the inductive assertion also satisfy the property. According to one definition, an inductive assertion describes a set of states that includes all legal initial states of the circuit design and that is closed under a transition relation that models the circuit design.

13 Claims, 2 Drawing Sheets

Receive an inductive invariant for a first property for a DUV
202

Assume at least the inductive invariant for the first property to be true while proving a second property for the DUV
204

INVARIANT SHARING TO SPEED UP FORMAL VERIFICATION

TECHNICAL FIELD

This disclosure generally relates to formal verification. More specifically, this disclosure relates to invariant sharing to speed up formal verification.

BACKGROUND

Related Art

The importance of circuit verification cannot be overemphasized. Indeed, without circuit verification it would have been practically impossible to correctly design complicated integrated circuits (ICs) which are commonly found in today's computing devices.

There have been many cases in which an error in a circuit implementation had a significant impact on the company's finances. For example, in one well-publicized instance, an error in a floating-point division circuit cost the company hundreds of millions of dollars. Therefore, it is very important to guarantee that an IC (or at least certain critical parts of an IC) will operate correctly.

Formal verification can provide such guarantees. In formal verification, the legal initial states and the operation of a design-under-verification (DUV) are modeled using a formal system, and a set of properties (i.e., a set of statements in the formal system) are defined to capture the correct behavior of the DUV. A formal verification system then tries to prove the properties based on the legal initial states and the DUV model.

The DUV is formally proven (or formally verified) if the formal verification system is able to prove the properties based on the legal initial states and the DUV model. If the formal verification system is able to determine a counterexample (i.e., a sequence of states that begins with a legal initial state and ends with a state that falsifies at least one property) based on the legal initial states and the DUV model, then the counterexample disproves the DUV (i.e., the counterexample is a mathematical proof that the DUV does not operate correctly). Another possibility is that the counterexample is due to an incorrectly specified property about the DUV. In this case the user needs to correct the property so that it accurately reflects the behavior of DUV.

For large and/or complex circuit designs, formal verification systems sometimes fail to formally prove or disprove a DUV. Therefore, what are needed are systems and techniques to improve performance of formal verification systems.

SUMMARY

Some embodiments described herein share inductive invariants of properties while performing formal verification of a circuit design. Specifically, some embodiments receive a set of properties that is desired to be proven for a circuit design. Once an inductive invariant for a property is determined, the embodiments can assume the inductive invariant for the property to be true (e.g., by treating the inductive invariant for the property as one of the assumptions) while proving another property.

According to one definition, an inductive invariant of a property is an inductive assertion such that all states that satisfy the inductive assertion also satisfy the property. According to one definition, an inductive assertion describes a set of states that includes all legal initial states of the circuit design and that is closed under a transition relation that models the circuit design.

In some embodiments, performing formal verification of the circuit design involves proving multiple properties using multiple formal verification engines in parallel. In these embodiments, the inductive invariant for a first property can be determined by a first formal verification engine that is proving the first property. The inductive invariant for the first property can be provided to a second verification engine that is proving a second property. The second formal verification engine can treat the inductive invariant for the first property as an assumption (i.e., the second verification engine can assume the inductive invariant for the first property to be true) while proving the second property.

In some embodiments, performing formal verification of the circuit design involves iteratively proving the set of properties using a formal verification engine, wherein in each iteration the formal verification engine can attempt to prove properties that have not yet been proven using the invariants of the previously proven properties. In each iteration, the properties that are yet to be proven or disproven can be processed in increasing order of expected difficulty (i.e., properties that are expected to be easy to prove or disprove are processed before other properties that are expected to be more difficult to prove or disprove). Additionally, the resources that are available to the formal verification engine for proving the set of properties can be progressively increased in each iteration.

DETAILED DESCRIPTION

Figure 1:
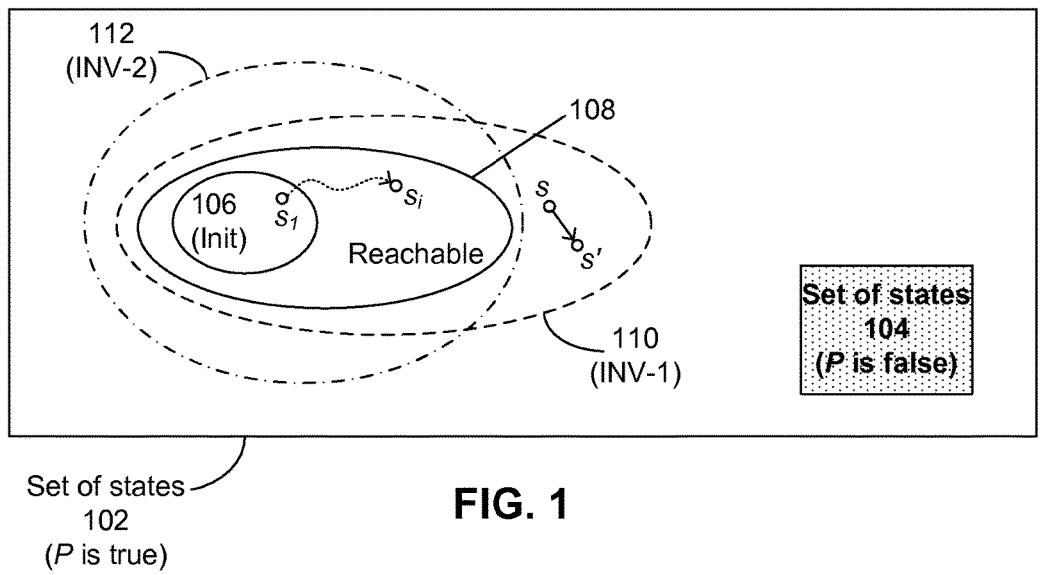
FIG. 1 illustrates reachable states and inductive invariants in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Inductive Invariants

A DUV can be modeled using a finite-state transition system, which can be formally defined as follows. A finite-state transition system $S:(\bar{i},\bar{x},I,T)$ can be described by a pair of propositional logic formulas: an initial condition $I(\bar{x})$ and a transition relation $T(\bar{i},\bar{x},\bar{x}')$ over input variables $\bar{i}$, internal state variables $\bar{x}$, and the next-state internal state variables $\bar{x}'$. In this disclosure, a bar on top of a literal, e.g., "$\bar{x}$", indicates that the symbol, e.g., "$\bar{x}$", represents a vector of variables instead of just one variable. Also, adding the prime symbol (') to an internal state variable represents the corresponding next-state variable, and adding the prime symbol to a formula, e.g., F', is equivalent to adding the prime symbol to all of the variables in the formula. For the sake of brevity, the symbol for a formula is sometimes used in this disclosure without brackets, i.e., sometimes we use the symbol "F" instead of the more complete version "$F(\bar{x})$".

A state of the DUV corresponds to an assignment of Boolean values to all internal state variables $\bar{x}$. For example, a state can be represented by a conjunction of literals, wherein each literal is a state variable or its negation. An assignment s to all variables of a formula F either satisfies the formula, i.e., $s|=F$, or falsifies the formula, i.e., $s|\neq F$. If s is interpreted as a state of a DUV and $s\ |=F$, then we say that s is an F-state. A formula F implies another formula G, i.e., $F \Rightarrow G$, if every satisfying assignment of F satisfies G. In other words, when $F \Rightarrow G$, the portion of the state space that satisfies F also satisfies G. If the state space is represented visually (e.g., as in FIG. 1 shown below), then the statement $F \Rightarrow G$ means that the set of states that satisfy F is a subset of the set of states that satisfy G.

A trace $s_0, s_1, s_2, \ldots$, which may be finite or infinite in length, of a transition system S is a sequence of states such that $s_0|=I$, and for each adjacent pair $(s_i, s_{i+1})$ in the sequence, $s_i, s_{i=1}'|=T$. In other words, a trace is a sequence of states that corresponds to an execution of the transition system (and therefore corresponds to the execution of the DUV). A state is considered to be reachable if the state exists in some trace of the transition system. In other words, a reachable state is a state that can occur during normal execution of the DUV.

The desired behavior of a DUV can be described using a set of properties. Each property can be represented as a formula $P_i(\bar{x})$ that can be evaluated for a given state s. The goal of the formal verification system is to prove that all reachable states satisfy each property $P_i(\bar{x})$. In other words, each property $P_i(\bar{x})$ asserts that only $P_i$-states are reachable and, for each property $P_i(\bar{x})$, the goal of the formal verification system is to either (1) prove property $P_i(\bar{x})$, i.e., prove that indeed only $P_i$-states are reachable, or (2) disprove $P_i(\bar{x})$, e.g., by determining a finite counterexample trace $s_0, s_1, s_2, \ldots, s_k$, such that $s_k|\neq P_i$.

A property can be a formula that is evaluated using the current values (i.e., the values in the current clock tick) of one or more internal state variables. Such properties can be used to describe relationships between internal state variables that must always hold, i.e., the relationships must hold in every clock tick. According to one definition, a clock tick is the smallest unit of time in which the digital state of the DUV can change. For example, a clock tick can correspond to a clock cycle if the DUV can change its digital state at every positive clock edge of the clock. A property can also be a statement in the formal system that is evaluated using the values of one or more internal state variables, wherein at least one variable value is evaluated at a clock tick that is different from the current clock tick. Such a property can be used to describe a behavior of the DUV that spans multiple clock ticks.

In this disclosure, the term "property" can generally refer to any statement in a formal system that is desired to be proven. Specifically, although some examples in this disclosure are described in the context of a particular type of property, it will be readily apparent to a person having ordinary skill in the art that the examples are also applicable to other types of properties.

Assumptions are statements in the formal system that can be used to constrain the state space, thereby potentially making it easier to prove or disprove properties. When assumptions are provided to a formal verification system, the formal verification system can try to prove a property by assuming the assumptions to be true. This allows the formal verification system to restrict the search space to only the set of states where the assumptions are true. For example, if the set of assumptions includes assumptions $A_1, A_2, \ldots, A_m$, then instead of trying to prove property $P_i$, the formal verification engine can try to prove the statement $A_1 \wedge A_2 \ldots \wedge A_m \Rightarrow P_i$, which is likely to be easier to prove than proving property $P_i$.

For a transition system $S:(\bar{i},\bar{x},I,T)$, an inductive assertion $F(\bar{x})$ describes a set of states that (1) includes all initial states, i.e., $I \Rightarrow F$, and (2) is closed under the transition relation: $F \wedge T \Rightarrow F'$ (i.e., given any state s that satisfies F, the next state s' according to transition relation T must also satisfy F). In other words starting from a state s in set F, any next-state of the system will still belong to set F. An assertion (e.g., an inductive assertion, a property, etc.) is any statement in the formal system that is desired to be proven. Note that assertions are different from assumptions because assertions and assumptions are treated differently by formal verification engines. Specifically, formal verification engines assume assertions to be true, and then try to prove assertions. Note that not every assertion is an inductive assertion. It is possible for an assertion to be true about a given DUV, but not be closed under transition relation making it not inductive.

FIG. 1 illustrates reachable states and inductive invariants (which are defined below) in accordance with some embodiments described herein. Set of states 102 includes all states that satisfy property P, i.e., property P is true in state s if and only if state s is in set of states 102. Set of states 104 includes all states that falsify property P, i.e., property P is false in state s if and only if state s is in set of states 104. Set of states 106 includes the legal initial states of a DUV, and set of states 108 includes the states that are reachable from the legal initial states. For example state $s_j$ is reachable because a trace (illustrated by the dotted curved line) exists that begins in legal initial state $s_i$ and that ends in state $s_j$. Note that set of states 106 (legal initial states) is a subset of set of states 108 (reachable states).

The goal of formal verification is to prove that the set of states 108 (reachable states) does not include any state from set of states 104, i.e., the intersection between set of states 108 and set of states 104 is the null set (visually this means proving that there is no overlap between the oval that corresponds to set of states 108 and the rectangle that corresponds to set of states 104).

An inductive invariant of a property is an inductive assertion such that all states that satisfy the inductive assertion also satisfy the property. Visually this means that the set of states that satisfy the inductive assertion is a subset of the set of states that satisfy the property. It follows from the definition of an inductive invariant that the intersection between the set of states that satisfy an inductive invariant of a property and the set of states that falsify the property is the null set.

A property can have multiple inductive invariants. For example, in FIG. 1, set of states 110 correspond to inductive invariant INV-1 of property P, and set of states 112 correspond to inductive invariant INV-2 of property P. Note that sets of states 110 and 112 are supersets of the legal initial states. This follows from the first condition that an inductive invariant must satisfy, namely, $I \Rightarrow F$, where I corresponds to the set of legal initial states, and F corresponds to the inductive invariant. Additionally, inductive invariants INV-1 and INV-2 are closed under the transition relation T. For example, for any given state s in set of states 110 (i.e., INV-1), the next state s' (i.e., the next state according to transition relation T) is also in set of states 110. Finally, note that there is no overlap between set of states 110 that satisfies inductive invariant INV-1 and set of states 104 that falsifies P, and likewise there is no overlap between set of states 112 that satisfies inductive invariant INV-2 and set of states 104 that falsifies P.

Note that a set of states that corresponds to an inductive assertion is a superset of the set of reachable states (this follows from the definition of an inductive assertion). If a formal verification system proves that there is no intersection between the set of states that satisfies an inductive assertion (e.g., set of states 110) and the set of states that falsifies a property (e.g., set of states 104), then the inductive assertion becomes an inductive invariant of the property. Note that, if a formal verification system can determine an inductive invariant for a property, then that is equivalent to proving that the property is satisfied by the DUV. This is because the existence of an inductive invariant implies that none of the reachable states falsify the property (this follows from the definition of an inductive invariant).

Some formal verification systems try to prove a property by determining an inductive invariant for the property. Specifically, some formal verification systems create an inductive assertion, and then try to prove that all states that satisfy the inductive assertion also satisfy the property. In other words, some formal verification systems try to create an inductive assertion F, and then try to prove the statement $F \Rightarrow P$. Once the formal verification system determines an inductive assertion $F_P$ for which it was able to prove the statement $F_P \Rightarrow P$, the system concludes that the DUV satisfies property P, and the system can output inductive invariant $F_P$ as the proof. For example, some techniques for determining inductive invariants are described in Aaron R. Bradley, "SAT-Based Model Checking without Unrolling," *Verification, Model Checking, and Abstract Interpretation*, Lecture Notes in Computer Science Volume 6538, 2011, pp. 70-87, which is herein incorporated by reference in its entirety for all purposes.

Conventional formal verification systems try to prove each property independently, e.g., by determining an inductive invariant for each property independently of other properties. In contrast to conventional formal verification systems, some embodiments described herein determine an inductive invariant for one property and then use the inductive invariant as an assumption to speed up the formal verification of another property. Some techniques and systems for speeding up formal verification by sharing inductive invariants are now described.

Sharing Inductive Invariants

Figure 2A:
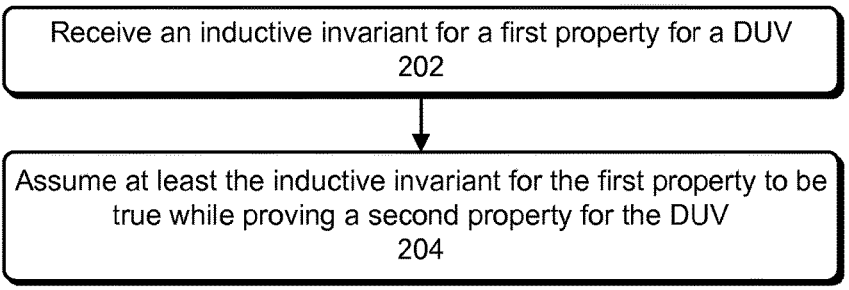
FIGS. 2A-2C illustrate processes for sharing inductive invariants during formal verification in accordance with some embodiments described herein.
Figure 2B:
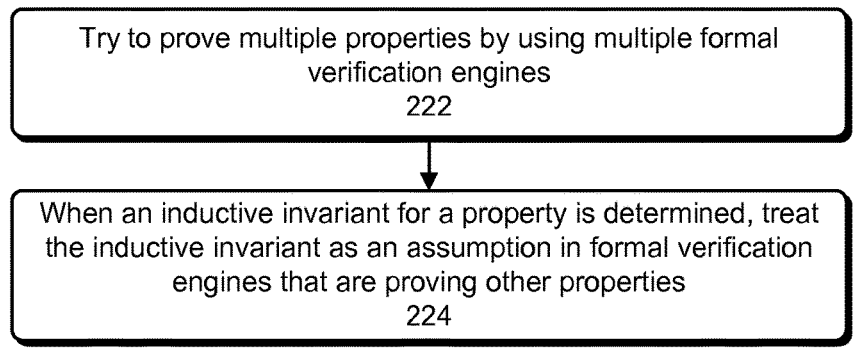
Figure 2C:
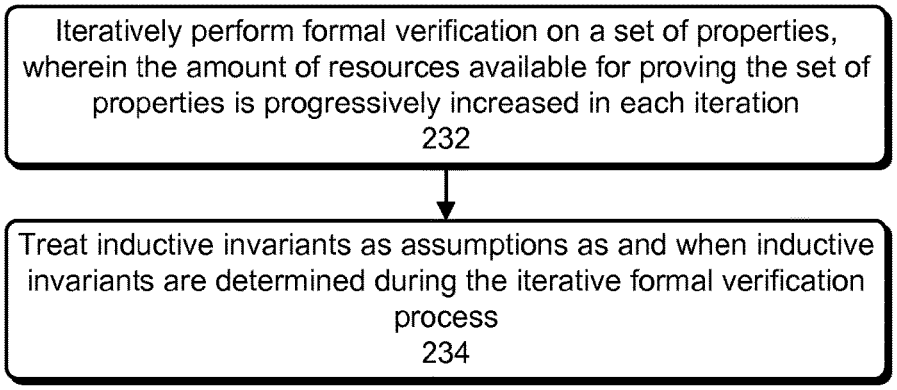

FIGS. 2A-2C illustrate processes for sharing inductive invariants during formal verification in accordance with some embodiments described herein. Let us assume that a set of properties is desired to be proven for a DUV. In the following discussion, the terms "first property" and "second property" can refer to any two properties in the set of properties. Some embodiments described herein are based on the following non-obvious insight: an inductive invariant for one property can be treated as an assumption while proving another property. Specifically, treating an inductive invariant of a given property as an assumption while proving other properties can reduce the search space that the formal verification engine has to consider when proving the other properties. Furthermore, note that assuming the inductive invariant for a property can be better than just assuming the property itself. This is because the inductive invariant of a property can be a "stronger" statement than the property itself. In other words, by assuming the inductive invariant of a property we effectively restrict the search space even more than merely assuming the property itself to be true. This follows from the definition of an inductive invariant for a property and is illustrated in FIG. 1 (the areas of the ovals that correspond to the states that satisfy the inductive invariants are smaller than the area of the large rectangle that corresponds to the states that satisfy the property).

In FIG. 2A, the process can begin by receiving an inductive invariant for a first property for a DUV (operation 202). Next, the process can assume at least the inductive invariant for the first property to be true while proving a second property for the DUV (operation 204). For example, the inductive invariant for the first property can be added to a set of assumptions that is being used by a formal verification engine for proving the second property.

In FIG. 2B, the process can begin by trying to prove multiple properties by using multiple formal verification engines (operation 222). Next, when an inductive invariant for a property is determined, the inductive invariant can be treated as an assumption in formal verification engines that are proving other properties (operation 224).

For example, suppose properties $P_1$, $P_2$, $P_3$, and $P_4$ are desired to be proven for a DUV. In some embodiments, the process can try to prove all four properties in parallel, e.g., by executing four formal verification engines on four processors (or on four cores within a processor chip) to prove the four properties. Next, the process can wait for a verification engine to output an inductive invariant (if a formal verification engine disproves a property, then the process can output the property that was disproven and the associated counterexample, and the process may continue to try to prove other properties or the process may terminate since at least one property has been disproven). For example, suppose an inductive invariant $INV_3$ is determined for property $P_3$. Recall that the fact that an inductive invariant was found for a property is equivalent to proving that the DUV satisfies the property. Therefore, at this point, property $P_3$ has been proven, and properties $P_1$, $P_2$, and $P_4$ remain to be proven. The process can then provide invariant $INV_3$ to the formal verification engines that are proving properties $P_i$, $P_2$, and $P_4$. The formal verification engines can then use $INV_3$ as an assumption while proving properties $P_1$, $P_2$, and $P_4$, thereby potentially improving performance because using $INV_3$ as an assumption can reduce the search space over which the properties need to be proven. As more properties are proven, the corresponding inductive invariants can also be used as assumptions. For example, suppose property $P_1$ is proven next, and the corresponding inductive invariant is $INV_1$. Then, the process can provide the inductive invariant $INV_1$ to the formal verification engines that are still trying to prove properties $P_2$ and $P_4$. These formal verification engines can use both $INV_1$ and $INV_3$ as assumptions while proving properties $P_2$ and $P_4$.

In FIG. 2C, the process can iteratively perform formal verification on a set of properties, wherein the amount of resources available for proving the set of properties is progressively increased in each iteration (operation 232). For example, the process can progressively increase the timeout in each iteration, wherein the timeout is the time duration that a formal verification engine is given for proving or disproving a property. Next, the process can treat inductive invariants as assumptions as and when inductive invariants are determined during the iterative formal verification process (operation 234).

For example, the process can begin by setting a low resource limit (e.g., a small timeout) and iteratively try to prove properties $P_1$, $P_2$, $P_3$, and $P_4$. Let us assume that, due to the low resource limit, the formal verification engine is unable to prove or disprove any of the four properties (if a formal verification engine disproves a property, then the process can output the property that was disproven and the associated counterexample, and the process may continue to try to prove other properties or the process may terminate since at least one property has been disproven). The process can then increase (e.g., by a fixed increment or dynamically computed increment) the resource limit (e.g., timeout) and again try to prove or disprove the four properties using the increased resource limit. Let us assume that property $P_3$ is proven in this iteration and the formal verification engine outputs inductive invariant $INV_3$ as the proof. Now, the process can assume inductive invariant $INV_3$ to be true (i.e., the process can treat inductive invariant $INV_3$ as an assumption) while trying to prove properties $P_1$, $P_2$, and $P_4$. Let us assume that the process iteratively tries to prove the properties while progressively increasing the resource limit until the next property, say $P_1$, is proven and inductive invariant $INV_1$ is outputted. At this point the process can start treating both $INV_1$ and $INV_3$ as assumptions and continue the iterative process for proving properties $P_2$ and $P_4$.

In some embodiments, the properties can be ranked based on the expected difficulty in determining an inductive invariant for the property (for example, the difficulty level can be estimated by analyzing the number of variables, the type of logical operations, the structure of the logical expressions, etc. of the property). In each iteration, the embodiments can attempt to prove the set of properties in increasing order of expected difficulty, i.e., the embodiments can try to prove the easier properties before trying to prove more difficult properties.

There are many different types of formal verification engines, e.g., some are based on property directed reachability, some are based on SAT/BDD based reachability, etc. Depending on the property, some types of formal verification engines can prove and/or disprove the property faster than other formal verification engines. Some embodiments described herein can use multiple formal verification engines to prove or disprove properties. For example, property $P_1$ can be provided to formal verification engines $E_{11}$, $E_{12}$, and $E_{13}$, property $P_2$ can be provided to formal verification engines $E_{21}$, $E_{22}$, and $E_{23}$, and so forth. As soon as a formal verification engine outputs an inductive invariant, the inductive invariant can be provided as an assumption to the other formal verification engines. For example, suppose engine $E_{22}$ is the first to determine an inductive invariant, say $INV_2$, for property $P_2$. Then, inductive invariant $INV_2$ can be provided as an assumption to the other formal verification engines, e.g., formal verification engines $E_{11}$, $E_{12}$, and $E_{13}$, that are working on properties that have not yet been proven or disproven. In some embodiments, multiple inductive invariants may be determined for a property by different formal verification engines. In these embodiments, all of the inductive invariants for a property may be provided as assumptions to other formal verification engines.

As explained above, some formal verification engines prove a property by determining an inductive invariant of the property. However, other formal verification engines are not based on inductive invariants, i.e., these formal verification engines do not output inductive invariants when they prove a property. In some embodiments both types of formal verification engines can be used. For example, let us assume that formal verification engines $E_{11}$, $E_{12}$, $E_{21}$, and $E_{22}$, are based on inductive invariants, but formal verification engines $E_{13}$ and $E_{23}$ are not based on inductive invariants. If $E_{11}$, $E_{12}$, $E_{21}$, or $E_{22}$ are the first to prove a property, then we can provide the inductive invariant as an assumption to formal verification engines $E_{13}$ and $E_{23}$. However, if $E_{13}$ or $E_{23}$ are first to prove a property, then we will not have an inductive invariant to provide to the other formal verification engines. There are at least two options in such cases, which are now discussed. Let us assume, without loss of generality, that $E_{23}$ is the first formal verification engine to prove a property. In the first option, the formal verification engines $E_{21}$ and $E_{22}$ can be allowed to continue executing so that they can determine an inductive invariant for property $P_2$. If an inductive invariant is determined, it can then be used as an assumption by the other formal verification engines. In the second option, formal verification engines $E_{21}$ and $E_{22}$ can be terminated since property $P_2$ has already been proven. In this option, the other formal verification engines will have to try and prove the other properties without the benefit of having an inductive invariant for property $P_2$ (even though an inductive invariant is not available, the other engines can assume $P_2$ itself to be true because the property was proven).

The above-described examples for sharing inductive invariants during formal verification have been presented for illustration purposes only and are not intended to limit the scope of the embodiments described herein. Various modifications of the above-described examples will be readily apparent to those skilled in the art, and the general principles illustrated in the above-described examples are applicable to other embodiments and applications without departing from the spirit and scope of the present disclosure.

Computer System

Figure 3:
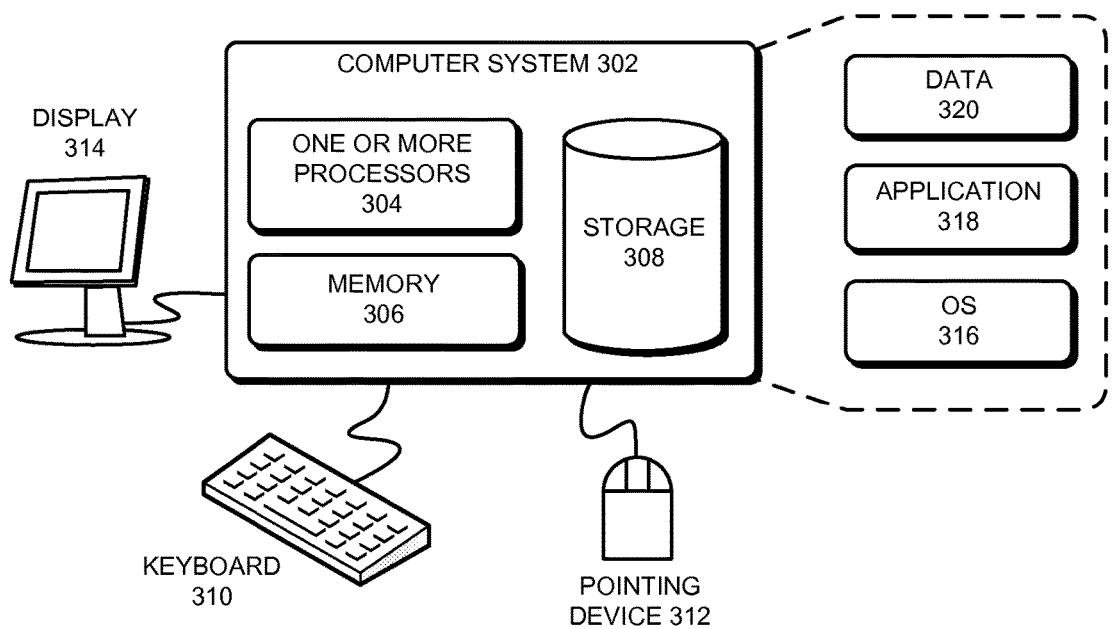
FIG. 3 illustrates a computer system in accordance with some embodiments described herein.

FIG. 3 illustrates a computer system in accordance with some embodiments described herein. Computer system 302 can include one or more processors 304, memory 306, and storage device 308. Computer system 302 can be coupled to display device 314, keyboard 310, and pointing device 312. Storage device 308 can store operating system 316, application 318, and data 320. Data 320 can include input required by application 318 and/or output generated by application 318.

Computer system 302 may automatically perform any method that is implicitly or explicitly described in this disclosure. Specifically, during operation, computer system 302 can load application 318 into memory 306. Application 318 can then be used by a user to perform formal verification of a DUV by sharing inductive invariants.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for performing a formal verification of a circuit design, comprising:

proving, by using a first formal verification engine that is stored at least partially in a first memory and includes or functions in conjunction with a first computer processor or a first processor core, a first property of the circuit design by determining a first inductive invariant for the first property, wherein each inductive invariant of a property is an inductive assertion such that all states that satisfy the inductive assertion also satisfy the property, and wherein the inductive assertion describes a set of states that (1) includes all legal initial states of the circuit design, and (2) is closed under a transition relation that models the circuit design;

proving, by using a second formal verification engine that is stored at least partially in a second memory and includes or functions in conjunction with a second computer processor or a second processor core, a second property of the circuit design by assuming at least the first inductive invariant for the first property of the circuit design to be true, wherein the first and second properties are selected from a set of properties that is desired to be proven for the circuit design, and wherein each property of the circuit design can be represented as a formula defined using one or more state variables associated with the circuit design; and wherein upon successful completion of the formal verification of the circuit design, subsequent steps in an integrated circuit (IC) design and fabrication process are performed to result in IC chips.

2. The method of claim 1, wherein multiple properties are proven by using multiple formal verification engines in parallel.

3. The method of claim 1, wherein the set of properties are proven iteratively, and wherein in each iteration an attempt is made to prove or disprove properties that have not yet been proven or disproven.

4. The method of claim 3, wherein resources available for proving the set of properties are progressively increased in each iteration.

5. The method of claim 3, wherein properties that are yet to be proven or disproven are processed in increasing order of expected difficulty in each iteration.

6. A non-transitory computer-readable storage medium storing instructions that, when executed by a processor, cause the processor to perform a method for performing a formal verification of a circuit design, comprising:

proving a first property of the circuit design by determining a first inductive invariant for the first property, wherein each inductive invariant of a property is an inductive assertion such that all states that satisfy the inductive assertion also satisfy the property, and wherein the inductive assertion describes a set of states that (1) includes all legal initial states of the circuit design, and (2) is closed under a transition relation that models the circuit design;

proving a second property of the circuit design by assuming at least the first inductive invariant for the first property of the circuit design to be true, wherein the first and second properties are selected from a set of properties that is desired to be proven for the circuit design, and wherein each property of the circuit design can be represented as a formula defined using one or more state variables associated with the circuit design; and wherein upon successful completion of the formal verification of the circuit design, subsequent steps in an integrated circuit (IC) design and fabrication process are performed to result in IC chips.

7. The non-transitory computer-readable storage medium of claim 6, wherein the set of properties are proven iteratively, and wherein in each iteration an attempt is made to prove or disprove properties that have not yet been proven or disproven.

8. The non-transitory computer-readable storage medium of claim 7, wherein resources available for proving the set of properties are progressively increased in each iteration.

9. The non-transitory computer-readable storage medium of claim 7, wherein properties that are yet to be proven or disproven are processed in increasing order of expected difficulty in each iteration.

10. An apparatus for performing a formal verification of a circuit design, comprising:
 a first processor;
 a first memory storing instructions that, when executed by the first processor, cause the first processor to prove a first property of the circuit design by determining a first inductive invariant for the first property, wherein each inductive invariant of a property is an inductive assertion such that all states that satisfy the inductive assertion also satisfy the property, and wherein the inductive assertion describes a set of states that (1) includes all legal initial states of the circuit design, and (2) is closed under a transition relation that models the circuit design;
 a second processor;
 a second memory storing instructions that, when executed by the second processor, cause the second processor to prove a second property of the circuit design by assuming at least the first inductive invariant for the first property of the circuit design to be true, wherein the first and second properties are selected from a set of properties that is desired to be proven for the circuit design, and wherein each property of the circuit design can be represented as a formula defined using one or more state variables associated with the circuit design; and
 wherein upon successful completion of the formal verification of the circuit design, subsequent steps in an integrated circuit (IC) design and fabrication process are performed to result in IC chips.

11. The apparatus of claim 10, wherein the set of properties are proven iteratively, and wherein in each iteration an attempt is made to prove or disprove properties that have not yet been proven or disproven.

12. The apparatus of claim 11, wherein resources available for proving the set of properties are progressively increased in each iteration.

13. The apparatus of claim 11, wherein properties that are yet to be proven or disproven are processed in increasing order of expected difficulty in each iteration.

* * * * *